(12) United States Patent
Howard

(10) Patent No.: US 11,377,394 B1
(45) Date of Patent: Jul. 5, 2022

(54) APPARATUS AND METHOD USING NATURAL FIBERS TO ENHANCE PLANT GROWTH

(71) Applicant: Chera Howard, Prattville, AL (US)

(72) Inventor: Chera Howard, Prattville, AL (US)

( * ) Notice: Subject to any disclaimer, the term of this patent is extended or adjusted under 35 U.S.C. 154(b) by 0 days.

(21) Appl. No.: 17/358,839

(22) Filed: Jun. 25, 2021

(51) Int. Cl.
  *C05F 11/00* (2006.01)
  *C05F 17/80* (2020.01)
  *C05F 17/964* (2020.01)

(52) U.S. Cl.
  CPC .............. *C05F 11/00* (2013.01); *C05F 17/80* (2020.01); *C05F 17/964* (2020.01)

(58) Field of Classification Search
  None
  See application file for complete search history.

(56) References Cited

U.S. PATENT DOCUMENTS

| | | | | |
|---|---|---|---|---|
| 1,945,229 A * | 1/1934 | Pagon | ........................ | C05F 1/02 422/612 |
| 5,633,163 A * | 5/1997 | Cameron | .............. | C05F 17/914 435/262 |
| 6,649,740 B1 * | 11/2003 | Smith | .................... | C09K 17/32 530/357 |
| 2010/0199514 A1 * | 8/2010 | Camisa | ................. | C02F 11/148 34/201 |
| 2016/0251274 A1 * | 9/2016 | Oh | ........................ | B09B 3/0083 71/18 |
| 2018/0065896 A1 * | 3/2018 | Van Iersel | ............... | C05F 11/08 |

* cited by examiner

*Primary Examiner* — Wayne A Langel
(74) *Attorney, Agent, or Firm* — Dale J. Ream

(57) ABSTRACT

A process and apparatus is disclosed for utilizing African American hair removed from a person's scalp as a fertilizing agent with superior results in enhancing the growth of plants and, specifically, for speeding the photosynthesis process. Unprocessed hair removed from the scalp of African American people appears dead and dry but, in fact, includes moisture near the base, fiber, and melanin capable of holding the water for slow release later. Collected hair may be deposited into a specialized cleaning assembly for cleansing, infusion with fertilizer, and agitated for needle felting into a mat, balls, or powder for application to the roots of a plant for slow release of water and fertilizer held in the hair so that the plant receives melanin protein.

10 Claims, 10 Drawing Sheets

APPARATUS AND METHOD USING NATURAL FIBERS TO ENHANCE PLANT GROWTH

REFERENCE TO RELATED APPLICATIONS

This application is related to U.S. Non-Provisional Patent Application Ser. No. 62/897,656 filed Sep. 9, 2019 and titled Method for Speeding Photosynthesis in Plants, the disclosure of which is incorporated herein in its entirety by reference.

BACKGROUND OF THE INVENTION

This invention relates generally to horticulture and, more particularly, to a method and natural hair fiber fertilizer product for speeding up the natural process of photosynthesis enhancing the growth of plants, reducing leaching, increasing and stimulating microbial activity in soils, carbon sequestration, increasing the negative charge in soil for increased CEC exchange, mineralization for nutrient availability, holds fertilizer in the soil longer, increase pore space and field capacity, maintain aerobic soils, regulate soil temp, and pulls moisture from micropores in soils, and can change soil structure.

Traditional fertilizers seek to provide nutrients to the roots of plants to enhance their growth. Although traditional fertilizers may be effective for their specific purposes, such fertilizers may not be effective under all moisture or soil conditions. Therefore, it would be desirable to have an alternative to traditional fertilizers and a method of application that is effective in either wet or dry conditions.

Specifically, the present invention is directed to a process of utilizing African descent hair removed from a person's scalp and used as a fertilizing agent with superior results in enhancing the growth of plants and, specifically, for speeding the photosynthesis process. Even more particularly, unprocessed hair removed from the scalp of African descent people appears to be dead and dry but, in fact, includes moisture near the base, fiber, and melanin capable of holding the water for slow release later. Preferably, collected hair may be agitated, rolled into balls, and infused with a fertilizer solution. This processed hair is inserted into a mesh receptacle and positioned about the stem of a plant, especially in dry environments, for slow release of the infused water held in the hair so that the plant receives melanin protein.

SUMMARY OF THE INVENTION

Traditional fertilizers do not attract UV rays and act as a filtering agent or provide plants 10 with nutrients by the use of mineralization. Foresee is able to hold water in the soil by increasing the porosity in soils. Foresee's cellulose composition signals microbes to create negative enzymes to degrade fibers. These negative enzymes are like a magnet that binds themselves to the positive nutrients in the soil. Other fertilizers cannot protect the seed and provide moisture and warmth as the protein does. It acts like the "Mother Cocoon" in the beginning stages of plant life. It communicates with the plant and allows the plant to speak so-to-speak as to its needs. As a mother feeds nutrients to the child in the womb, melanin protein feeds, warms, and moisturizes the seed, or plant in a controlled manner. Therefore, a general object of this invention is to provide fertilizer and a fertilizer accessory process that enhances the growth of plants and provides many benefits.

Another object of this invention is to provide the fertilizer and process, as aforesaid, that utilizes melanin protein obtained from hair follicles harvested from people of African descent.

Still another object of this invention is to provide the fertilizer and process, as aforesaid, having a packet or mesh bag for holding the fertilizer about the stem of a plant so as to form the "Mother Cocoon" around the plant in the beginning stages of its life.

Yet another object of this invention is to provide the fertilizer and process as aforesaid, in which the African American hair is packed into the packet and used exclusively in a dry environment so that water from the hair will slow-drip onto the plant, whereas the protein water is applied directly in a very wet environment.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along line 3b-3b of FIG. 3a;

FIG. 4a is an interior exploded view of the cleaning assembly of FIG. 2a;

FIG. 4b is an isolated view of on an enlarged scale taken from FIG. 4a;

DESCRIPTION OF THE PREFERRED EMBODIMENT

Figure 1:
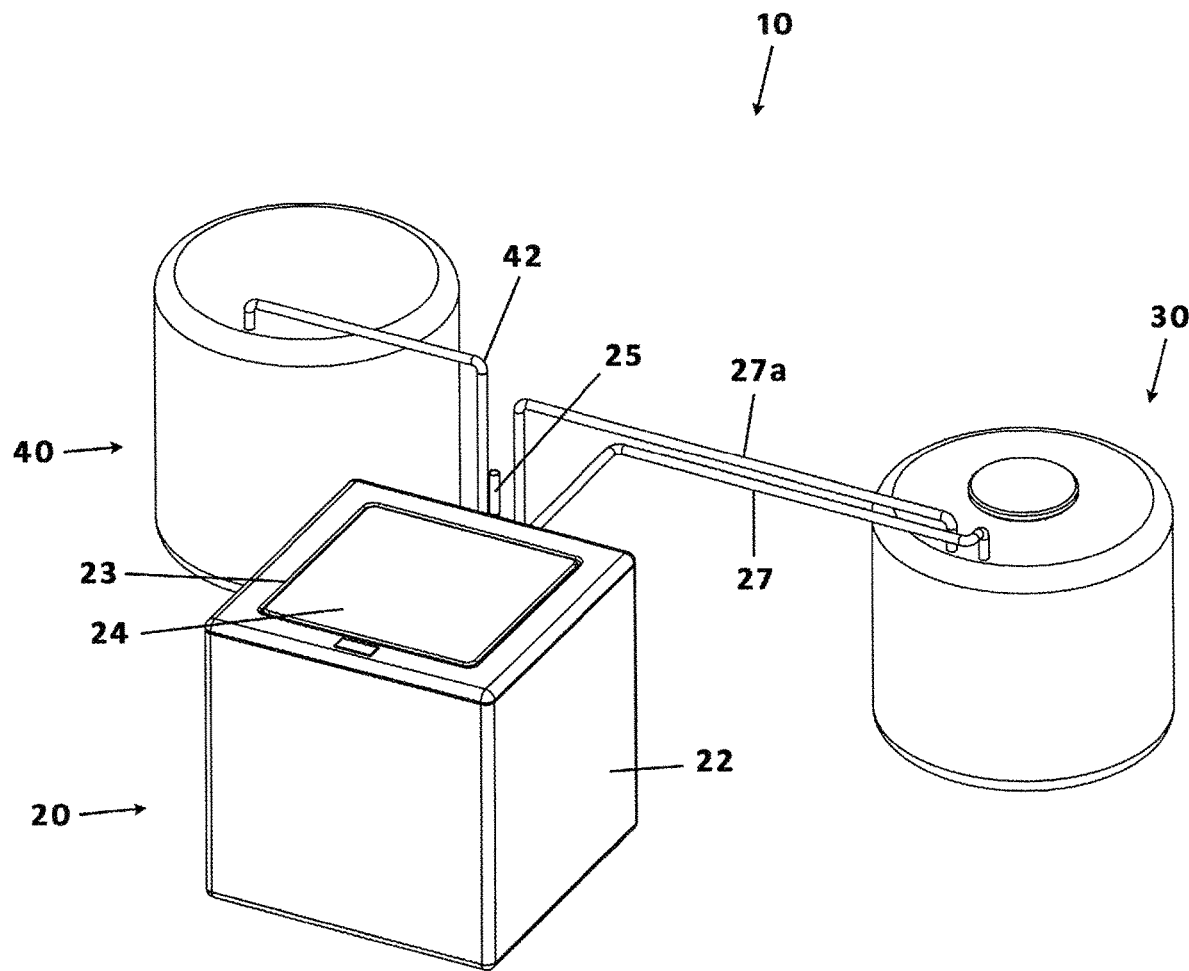
FIG. 1 is a front perspective view of an apparatus for enhancing growth of a plant according to a preferred embodiment of the present invention.
Figure 2:
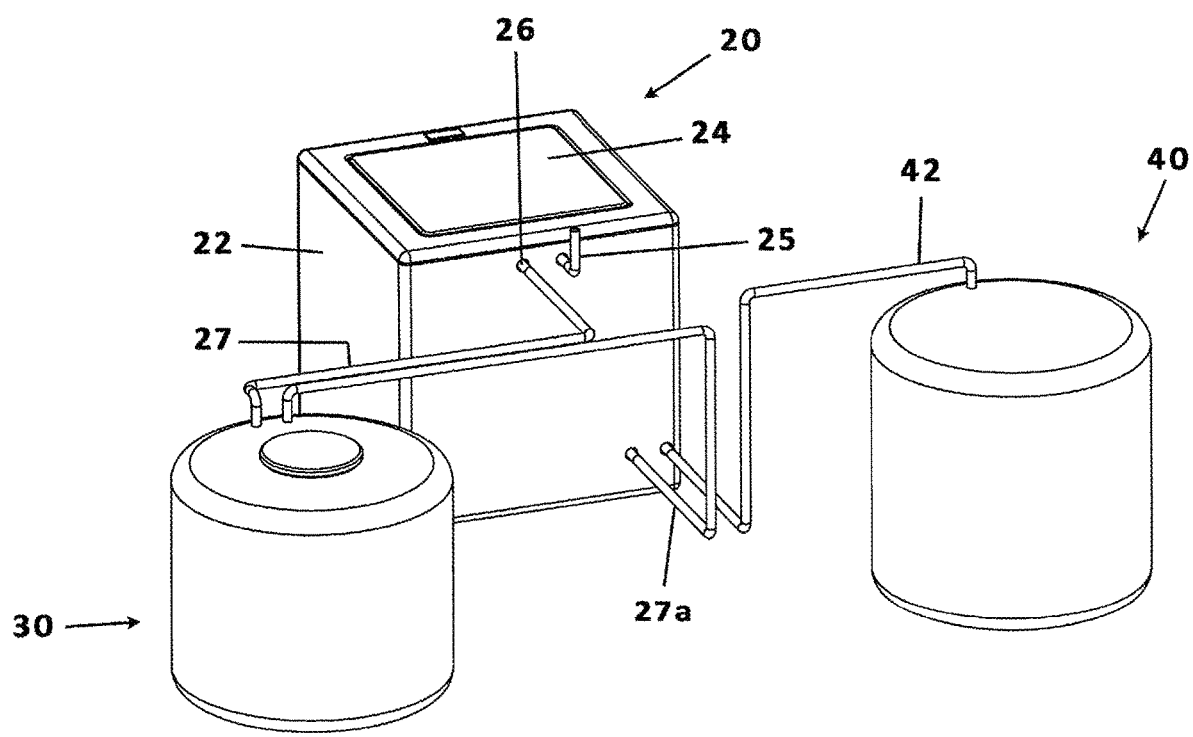
FIG. 2 is a rear perspective view of the apparatus as in FIG. 1.
Figure 3A:
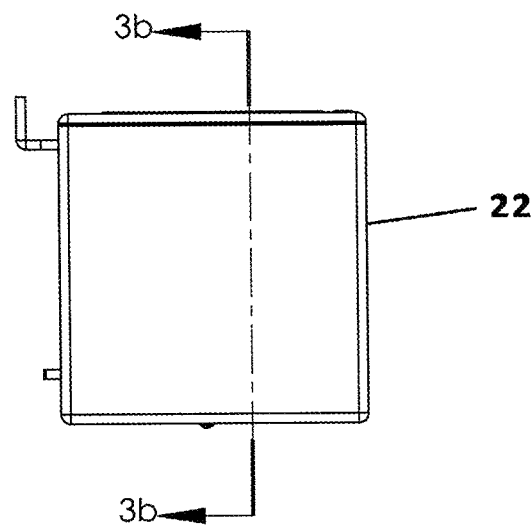
FIG. 3a is a side view of the cleaning assembly removed from the apparatus of FIG. 1.
Figure 3B:
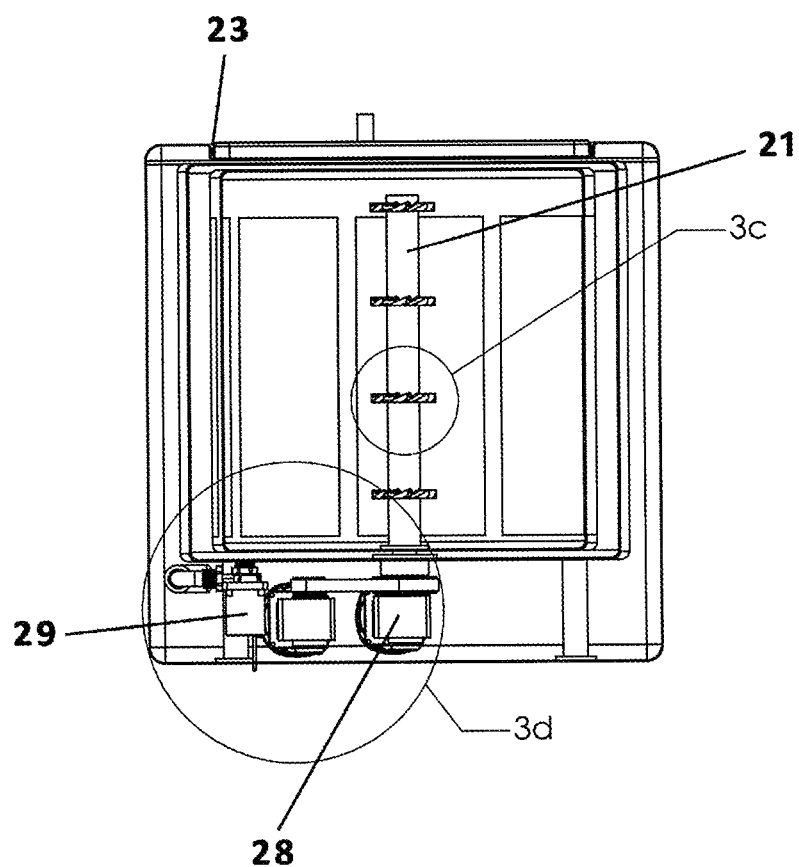
Figure 3C:
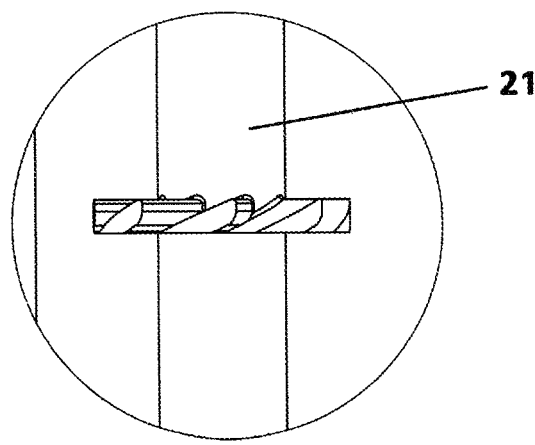
FIG. 3c is an isolated view of on an enlarged scale taken from FIG. 3b.
Figure 3D:
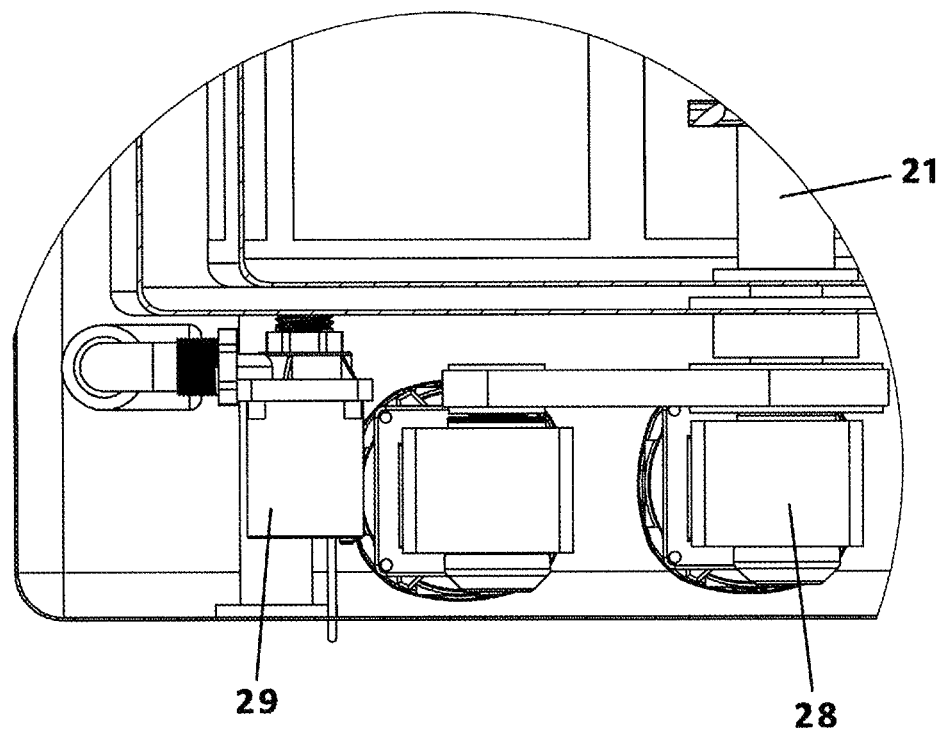
FIG. 3d is an isolated view of on an enlarged scale taken from FIG. 3b.
Figure 4A:
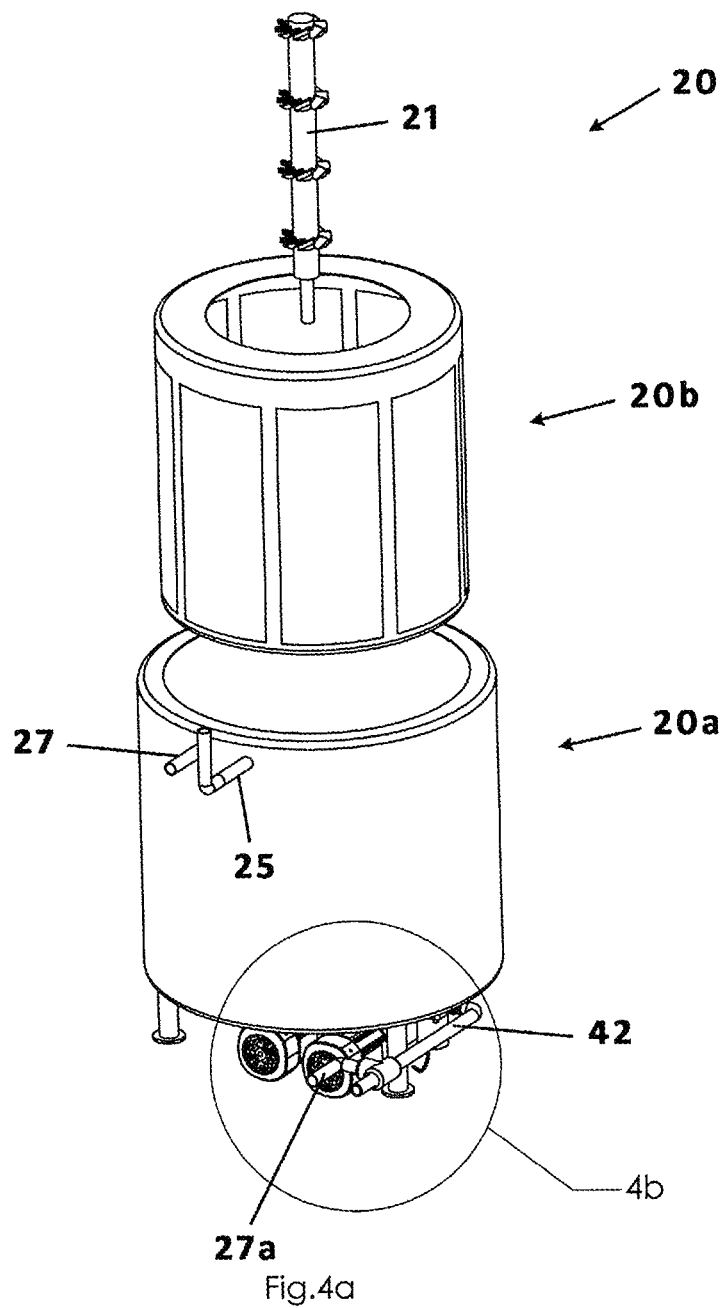
Figure 4B:
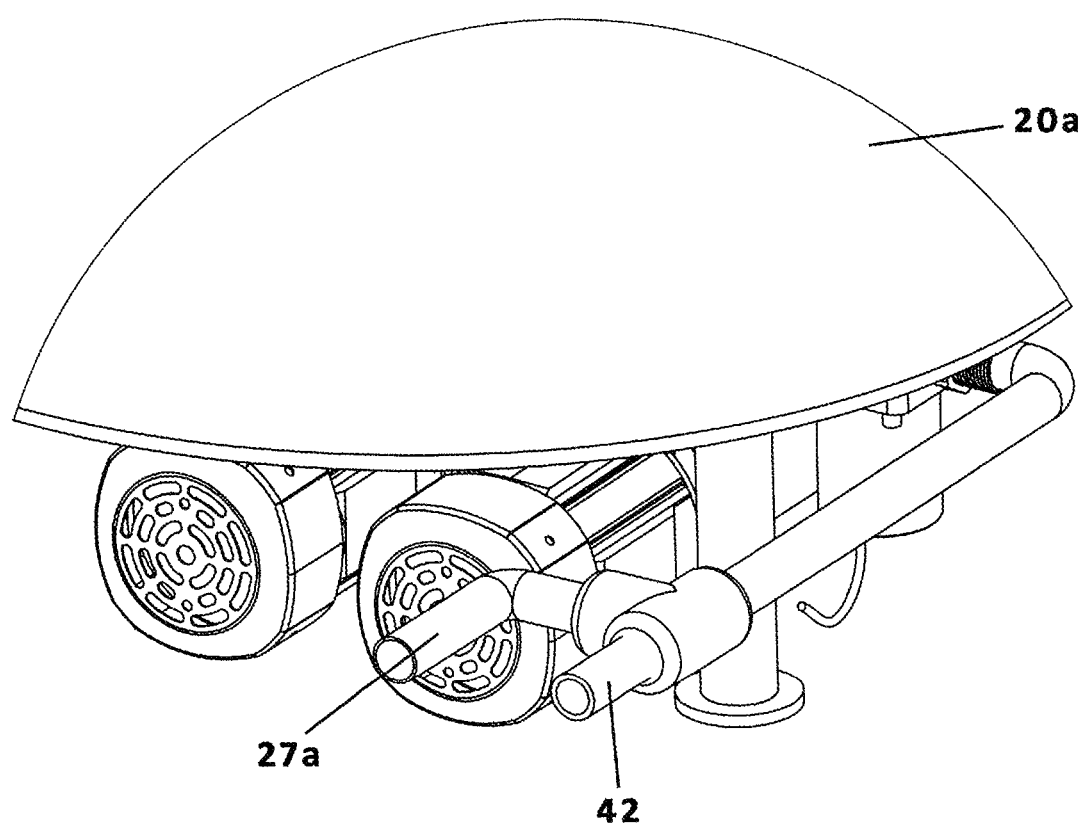

An organic fertilizer, apparatus 10, and process 100 for speeding up the natural process of photosynthesis and enhancing the in the growth of plants is disclosed and described with reference to FIGS. 1 to 6 of the accompanying drawings. In addition, a mat, balls, powder, or a mesh bag or packet, infused with fertilizer-infused hair fibers and positioned around the stem of a plant or a controlled release of moisture fertilizer is disclosed.

Preferably, the present invention involves a method for enhancing plant growth that involves collecting natural fibers—particularly, natural African American hair—to enhance plant growth, rolling the group of hair fibers into balls or bundles when operated upon by a cleaning assembly 20 having an agitator 21, infusing a liquid fertilizer solution into the cleaned fibrous bundles, and packing the infused bundles into a mesh bag for deposition into or atop soil on or near the roots of a plant planted in a soil layer.

Preferably, natural hair fibers from African-American men may be collected in large quantities used for use in the present invention, such as may be collected in barbershops, salons, hospitals, and the like. Collecting hair fibers may seem extreme at first; however, African-descent hair has important qualities that are advantageous to horticulture and, therefore, critical to the present invention. While hair fibers from persons of African descent are preferred, they may be successfully combined with hair fibers taken from non-African-American persons or even some animals. It is understood that the step of collecting hair fibers may include a computer software "app" running on a mobile electronic device such as a smart phone or tablet.

Hair is a living organism and serves the same purpose even if it is no longer attached to the follicle. Melanin filled African American unprocessed hair carries a unique characteristic. One main component is its melanin properties to absorb good ultraviolet light and warmth. The more sunlight that is in the presence of melanin the more melanin is produced. African American unprocessed hair is extremely dry on the outer surface, but moisture is stored near the scalp (the root system).

Melanin has powerful detoxification high anti-toxic potential and control over enzymatic process. All chemical reactions in living organisms is catalyzed by enzymes. For example, the soil changes, becomes dry. The protein water or protein absorbs the substrates on their surfaces and enhance the reaction i.e., formation of the product. (Enzymatic Process).

In another important aspect, the method steps described above are preferably carried out in conjunction with a specific apparatus 10 or system. More particularly, the apparatus 10 for enhancing the growth of a plant according to the present invention includes a cleaning assembly 20, a fertilizer bin 30, and a wastewater reservoir 40. More particularly, the cleaning assembly 20 includes a housing 22 having a bottom wall or base and a plurality of sidewalls extending upwardly from the bottom wall and having a top wall opposite the bottom wall that at least partially connects upper edges of the sidewalls such that the walls of the housing 22, together, define an interior area that is open. Further, the top wall may define an opening 23 in fluid communication with the interior area. It will be understood that the plurality of hair fibers collected as described above may be deposited into the interior area of the housing 22 via the opening 23 or open top wall. The housing 22 may include a lid 24 that may be opened or closed to regulate insertion of hair fibers. More particularly, the lid 24 may be pivotally opened or closed, such as being mounted with a hinge between an open configuration allowing hair fibers to be inserted into the interior area and a closed configuration not allowing access to the interior area.

The cleaning assembly 20 may be in fluid communication with a water source and with a fertilizer bin 30 and with a wastewater reservoir 40 as will be described below. More particularly, the housing 22 may include a water inlet port 25 that is in fluid communication with a traditional water line. Further, the housing 22 may include a fertilizer port 26 in fluid communication with the fertilizer bin 30, such as via an incoming connecting tube 27. There may also be a fertilizer return tube 27a. Similarly, the housing 22 may be in fluid communication with the wastewater reservoir 40 via another connecting tube 42. The actuation of communications between the cleaning assembly 20, fertilizer bin 30, and wastewater reservoir 40 may be controlled by electronic controllers or processors and programming as would be known in the art.

Further, the cleaning assembly 20 may include and outer water tub 20a, an inner wash tub 20b inside the outer water 20b, and an agitator 21 situated in the interior area of the inner wash tub 20b. The agitator 21 may be a rod having arms or fins that extend laterally and may be electrically connected to a motor 28 which may be connected to a power source such as an AC connection or battery. The agitator 21 is operative via a pump 29 to rotate when the motor is energized with electricity and water has been introduced into the housing 22. In other words, the agitator 21 rotates and generates rotational currents when a wash cycle is initiated, whether by a user input (e.g., a user pressing a start button) or by a software instruction. Preferably, a plant-based cleanser or detergent, water, and the plurality of hair fibers are received into the interior area of the housing 22 and a wash cycle is initiated such that dirt and salt are removed from the hair fibers. It is understood that the water—referred to herein as wastewater—may be drained from the interior area into the wastewater reservoir 40 at the end of a wash cycle.

In addition, the rotational currents generated by rotation of the agitator 21 may cause an intertwining or entanglement of the plurality of hair fibers. Specifically, the agitator 21 may have a shape configuration that causes the hair fibers to form what will be referred to as a bundle 60 of hair fibers, such as in the form of a ball, hairball, or cube.

A liquid fertilizer solution is contained in the fertilizer bin 30 and is transferred to the cleaning assembly 20 after the wastewater has been drained from the housing 22 following a wash cycle, at other predetermined times, or when actuated during a cleaning cycle. The fertilizer solution includes a water-soluble fertilizer. When actuated, a predetermined quantity of the fertilizer solution is delivered to the housing 22 where it is infused into the at least one bundle and, preferably, a plurality of bundles, of hair fibers. The fertilizer may include a compost material, referred to as compost tea. Preferably, the ingredients of compost tea include non-chlorinated water, unsulfured blackstrap molasse, kelp fertilizer, and fish fertilizer. Compost tea is a mixture of nutrients and oxygen-loving (aerobic) bacteria, fungi, nematodes and other microbes that live in finished compost.

In an embodiment, the step of depositing fertilizer into the cleaning assembly 20 may be repeated, including the steps of cleansing and agitation. The agitation process causes a bundle to absorb the infused water-soluble fertilizer. Then, the cleaning assembly 20 is operable to conduct a spin cycle to remove excess water-soluble fertilizer and actuate its return to the fertilizer bin 30 where it may be recycled and re-used. Finally, the cleansed and fertilizer-infused bundles may undergo a drying and decomposition process.

The overall process 100 for enhancing growth of a plant is illustrated in FIG. 5 and is representative of the method described above. Specifically, block 102 represents depositing water (preferably non-chlorinated water) into the cleaning assembly along with African-American hair fibers to be cleansed. Further, block 104 represents the step of actuating the cleaning assembly 20 to perform an agitation process intended for cleansing the fibers and forming up one or more hair bundles 60 or cubes. Next, the cleansing assembly 20 is operable to perform a spin cycle to remove water from the hair bundles 60 and spin them up and shape them and actuate a return of the removed water to the wastewater reservoir 40, as indicated at block 106. From here and referred to by block 108, the fertilizer bin 30 may be actuated to deliver fertilizer (e.g., compost tea) for infusion into the cleansed hair bundles 60, followed by another agitation process 110 and fertilizer recycling process (repeat of prior steps). A final step 112 may include sewing the cleansed and fertilizer bundles 60 to form a mat 70, such as via a felting process and using a felting machine, for placement on or under a soil surface proximate a plant/turf whose growth is to be enhanced. Mat 70 is also used as a buffer between soil and turf as a nutrient and water reservoir.

Figure 5A:
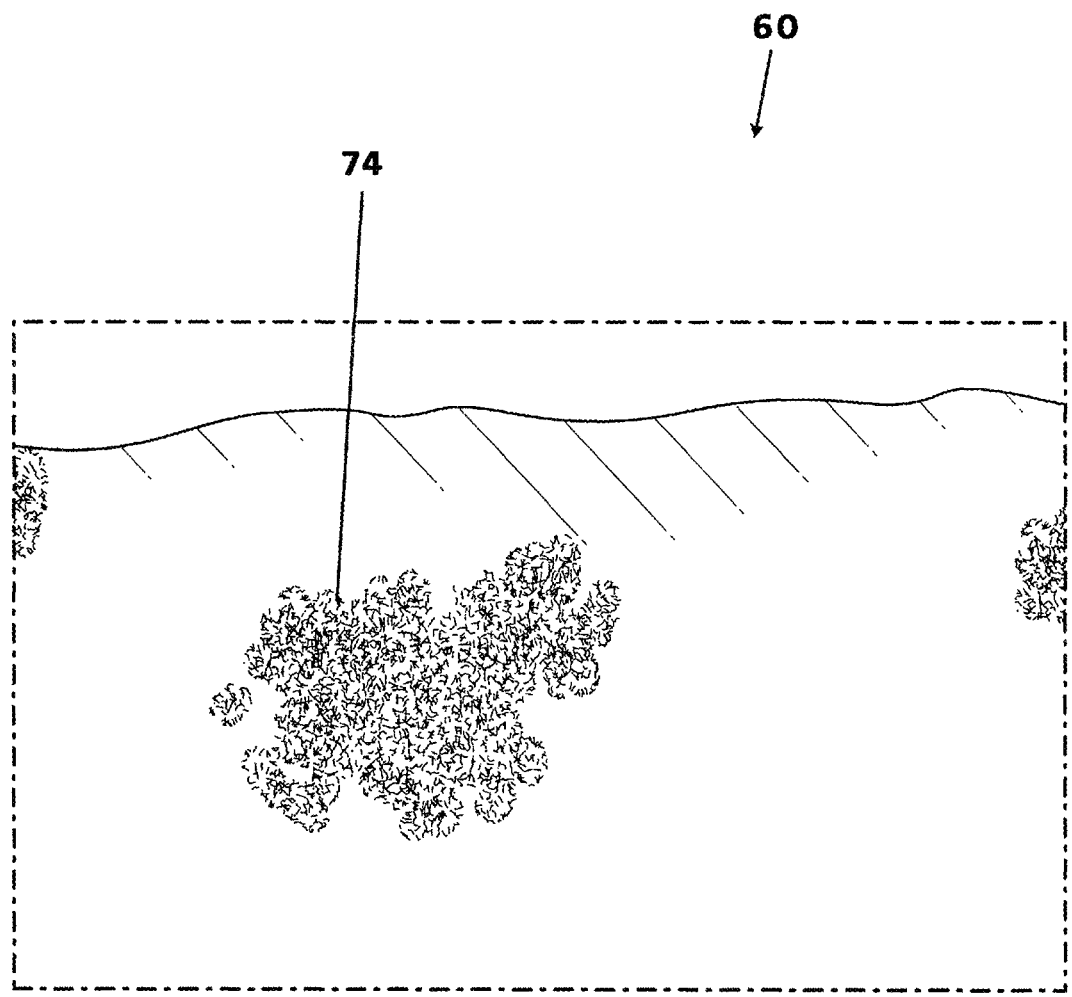
FIG. 5a is an isolated view on an enlarged scale of a powder form of a hair bundle according to the present invention.
Figure 5B:
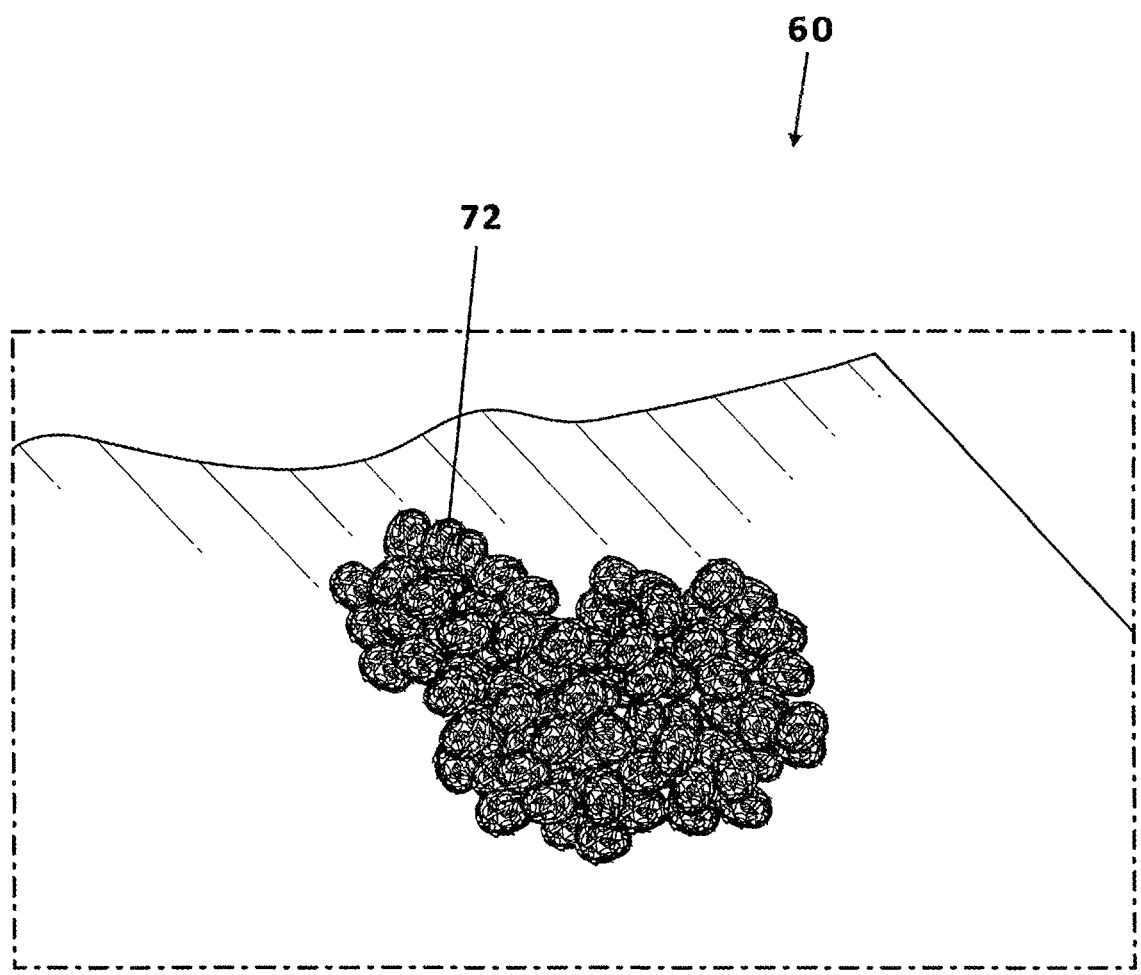
FIG. 5b is an isolated view on an enlarged scale of a ball form of a hair bundle according to the present invention.
Figure 5C:
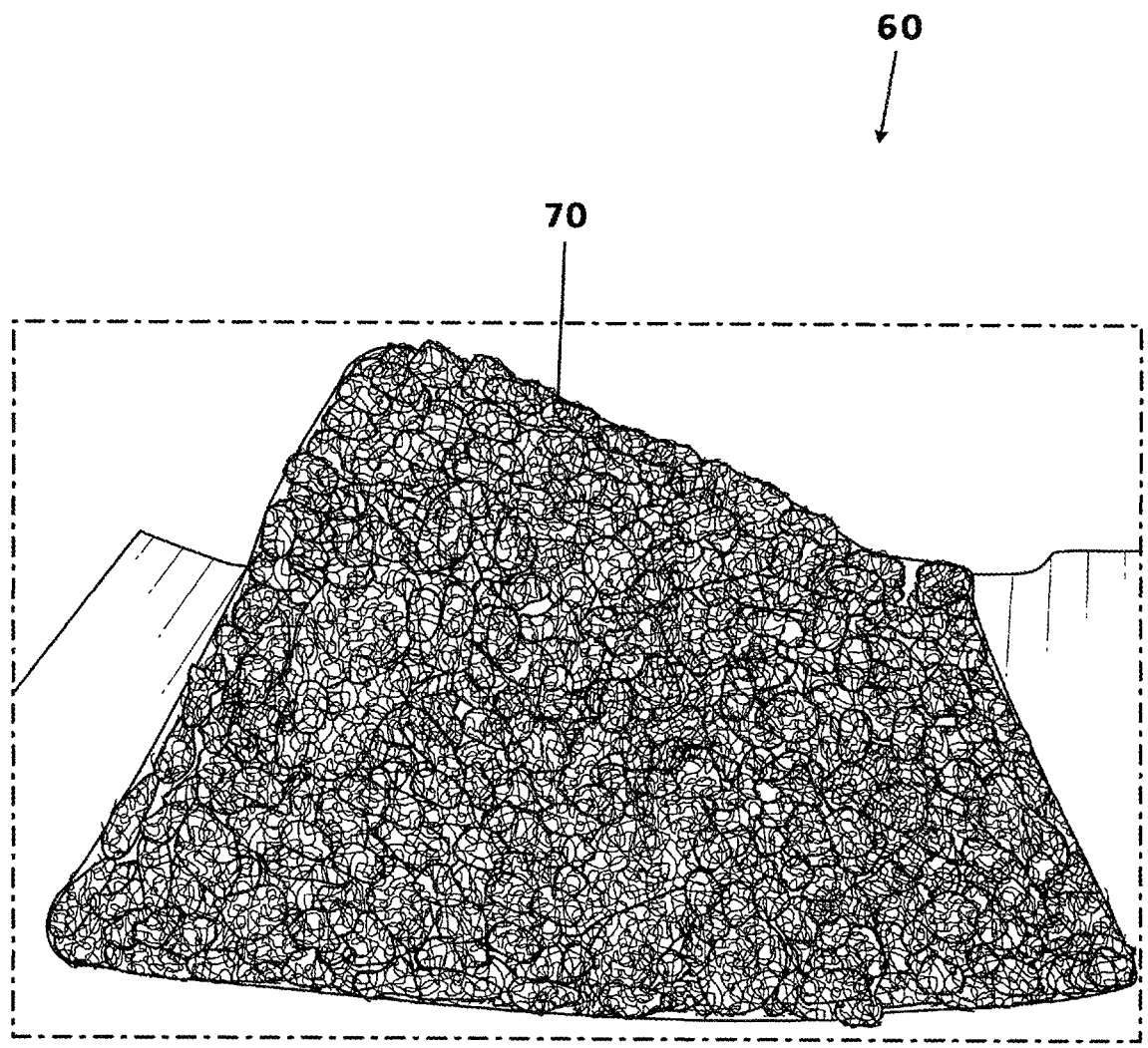
FIG. 5c is an isolated view on an enlarged scale of a mat of hair fibers according to the present invention.
Figure 6:
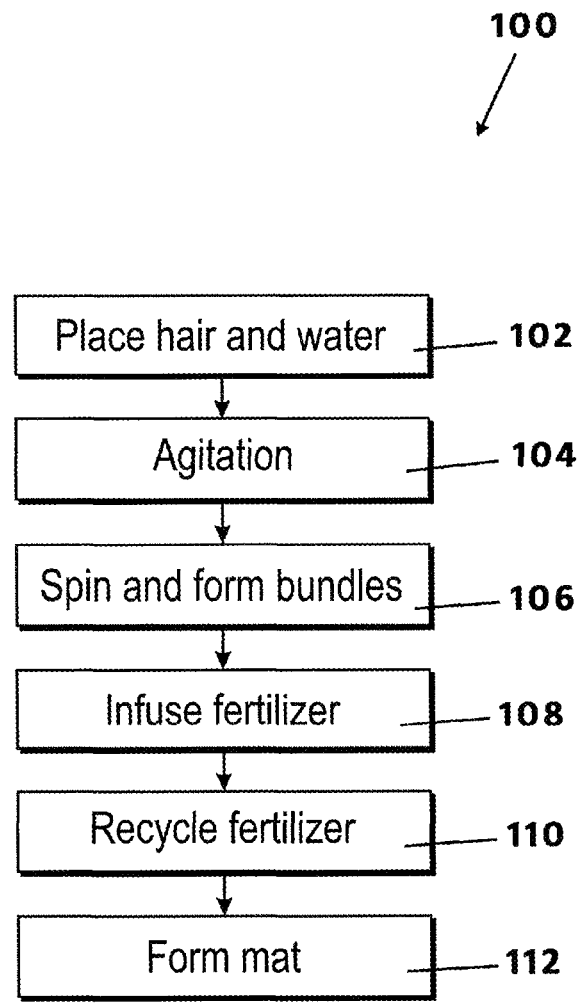
FIG. 6 is a flowchart illustrating a method for enhancing growth of a plant according to a preferred embodiment of the present invention.

With reference to the one or more bundles 60 using hair fibers, there are at least three types of bundles that may be formed according to the present invention. Specifically, a bundle 60 may be in the form of a mat 70, pellet balls 72, or powder 74 as shown in FIGS. 5C, 5B, 5A, respectively. More particularly, the mat 70 is an article derived from African-descent hair using a needle-felting process with a burlap material between top and bottom layers of hair. More particularly, hair is placed on the top and bottom of a coarse woven canvas derived from natural eco-friendly fiber (Burlap). Using a needle-felting machine, special needles containing grooves are aligned so that hair placed on top is grabbed by grooves in the needles and pushed through the burlap and attached to the hair placed on the bottom of the burlap. Hair placed on the bottom of the woven canvas material is also grabbed by needles as well, is pulled from the bottom to attach itself to the top layer, and forms a carpet-like mat. The mat 70, then, may be placed on or below a soil layer proximate to the plant whose growth is to be enhanced. Accordingly, the plant will reap the benefit of the infused fertilizer and melanin rich hair fibers In the case of pellet balls 72, they may be placed directly into the soil or used as a soil amendment. This form of a hair bundle may be formed using the cleansing and agitation process described previously. In this instance, the process of cleansing the hair, storing the water removed from cleansed hair, and infusing compost tea or fertilizer are critical steps. Regarding the powder 74, the powder form may be added to soil to amend the textures in the soil to improve nutrient availability.

Various of the forms or types of hair bundles have the following advantages or characteristics:
a. Stimulate increase in microbial activity (powder, pellet, mat)
b. Carbon sequestration (Powder, Pellet)
c. Increase negative charge, CEC Exchange, pore space, and field capacity (Powder)
d. Binds soil and fertilizer (powder, liquid)
e. Maintain aerobic soil and regulate soil temperature (Powder)
f. Reduce the ability of micropores to consume available water from plants, thus reduce process of plants reaching wilting point (Powder)

In another embodiment, the apparatus 10 may include a porous container for containing an infused bundle 60 and insertion of a bundle into the porous container is then applied to a soil layer immediately adjacent or proximate to a plant (e.g., seed, flour, tree, vegetable, or the like). This embodiment was shown and described in the related application identified above and is incorporated herein by reference. The porous container may be a mesh bag, a square packet, or some other packaging that includes a construction suitable for a slow release of moisture and fertilizer. For instance, a mesh bag is a preferred porous container that is constructed of a plurality of threads arranged in a spaced apart or honeycomb arrangement that is advantageous for a slow release of the contents of the bag, such as a release of water and fertilizer. In addition, the mesh bag has an open neck and defines an interior space—the open neck being dimensioned and suitable to receive a bundle 60 into the interior space. In addition, the mesh bag allows the roots of a plant to grow up in and through its outer surface so as to contact the contents inside. Preferably, the bag may be constructed of paper or a paper-based material that may decompose or otherwise allow roots to extend or grow therethrough.

It is understood that the thread pattern of the mesh bag is suitable for containing the bundle 60, i.e., keeping the ball from unraveling as it slowly drips its contents into the soil. In addition, the mesh bag may include a drawstring that is threaded around the neck and operative to close the opening when the drawstring is pulled, such as after a bundle has been received into a mesh bag.

Accordingly, the planting of a seed or the roots of young plants are enhanced using a non-traditional method and apparatus for generating and using an all-natural fertilizer.

It is understood that while certain forms of this invention have been illustrated and described, it is not limited thereto except insofar as such limitations are included in the following claims and allowable functional equivalents thereof.

What is claimed is:

1. An apparatus for enhancing growth of a plant, comprising:
 a cleaning assembly having a housing that defines an opening in fluid communication with an interior area capable of receiving a plurality of hair fibers via said opening into said interior area,
 said cleaning assembly having an agitator situated in said interior area and electrically coupled to a motor, said agitator configured to rotate when said motor is energized for cleansing said plurality of hair fibers;
 wherein said agitator has a shape configuration that intertwines said plurality of hair fibers into at least one bundle when actuated;
 a fertilizer bin in fluid communication with said cleaning assembly for containing a liquid fertilizer;
 means for infusing said liquid fertilizer into said at least one bundle;
 a mat formed of said infused bundle bonded to a plurality of thread fibers.

2. The apparatus as in claim 1, wherein said plurality of hair fibers include hair fibers taken from a person of African descent.

3. The apparatus as in claim as in claim 1, wherein said plurality of hair fibers include animal hair.

4. The apparatus as in claim 1, wherein said fertilizer is a liquid solution of water-soluble fertilizer.

5. The apparatus as in claim 1, wherein said housing includes a lid that is pivotally movable between an open configuration allowing access to said interior area and a closed configuration not allowing access to said interior area.

6. The apparatus as in claim 1, wherein said at least one bundle is one of a plurality of balls of entangled hair fibers or is powderized hair fibers.

7. The apparatus as in claim 1, wherein said plurality of hair fibers each include melanin.

8. The apparatus as in claim 7, wherein said plurality of cleansed hair fibers are bonded to said plurality of thread fibers via needle-felting.

9. The apparatus as in claim 1, further comprising a mesh bag constructed of a plurality of threads arranged so as to define a plurality of fine openings, said mesh bag having a neck that is open until manually closed using a drawstring and is in communication with an interior space for receiving and containing said infused bundle into said interior space.

10. The apparatus as in claim 9, wherein said drawstring coupled to said neck and operative for selectively closing said neck so as to prevent access to said interior space.

\* \* \* \* \*